United States Patent [19]

Clampitt et al.

[11] 4,081,587

[45] Mar. 28, 1978

[54] PROCESS FOR THE MANUFACTURE OF ETHYLENE-ACRYLIC ACID COPOLYMERS

[75] Inventors: Bert H. Clampitt; Ronald E. Gilbert, both of Katy, Tex.

[73] Assignee: Gulf Oil Corporation, Pittsburgh, Pa.

[21] Appl. No.: 797,649

[22] Filed: May 16, 1977

[51] Int. Cl.$^2$ .............................. C08F 8/14; C08F 8/50
[52] U.S. Cl. ........................................ 526/54; 526/16; 526/30; 528/481
[58] Field of Search ...................... 526/54, 30; 528/481

[56] References Cited

U.S. PATENT DOCUMENTS

| 2,109,877 | 3/1938 | Burrett | 526/54 |
| 3,249,570 | 5/1966 | Potts et al. | 526/54 |

FOREIGN PATENT DOCUMENTS

| 1,065,620 | 9/1959 | Germany | 526/54 |

*Primary Examiner*—William F. Hamrock

*Attorney, Agent, or Firm*—Richard L. Kelly

[57] ABSTRACT

A process is provided for preparing a copolymer of ethylene and acrylic or methacrylic acid. Typically, a copolymer of ethylene and methyl acrylate is dissolved in a diarylalkane such as 1,1-dixylylethane. A transesterification catalyst and either isopropanol or tertiary butanol is added to the polymer solution which then is heated to reflux to convert the polymerized methyl acrylate moiety to the isopropyl or tertiary butyl acrylate moiety. Following completion of the transesterification reaction, any excess isopropanol or tertiary butanol is removed from the reaction system by distillation. The polymer solution then is heated to a temperature of the order of 320° C to thermally crack the isopropyl or tertiary butyl acrylate and form the corresponding ethylene-acrylic acid copolymer. The ethylene-acrylic acid copolymer is insoluble in the diarylalkane and can be recovered by filtration.

7 Claims, No Drawings

PROCESS FOR THE MANUFACTURE OF ETHYLENE-ACRYLIC ACID COPOLYMERS

BACKGROUND OF THE INVENTION

Copolymers of ethylene and acrylic or methacrylic acid are useful for diverse industrial purposes. The commercial use of such polymers has been restricted by the difficulties of preparing such copolymers.

The direct preparation of such copolymers by copolymerizing ethylene with acrylic or methacrylic acid is difficult. The difficulties are magnified when it is desired to prepare such copolymers having a relatively high concentration of the acid. Acrylic and methacrylic have a strong telegenating effect upon the copolymerization reaction and copolymers of unusually low molecular weight are obtained when one attempts to incorporate high concentrations of the acrylic or methacrylic acid in the copolymer. In addition, acrylic and methacrylic acids are highly corrosive and such copolymerizations must be run in either glass-lined or stainless steel equipment.

By reason of the difficulties discussed in the paragraph above, indirect processes for the manufacture of ethylene-acrylic acid copolymers have been developed. U.S. Pat. No. 3,970,626 described a multistep process in which an ethylene-alkyl acrylate copolymer is heated in an aqueous alkaline medium to hydrolyze the alkyl acrylate groups and to convert resulting copolymer to an alkali metal salt of the ethylene-acrylic acid copolymer. The alkali metal salt of the polymer forms an emulsion with the water and the ethylene-acrylic copolymer can be recovered by adding an acid to the emulsion. This process has a relatively high capital requirement in that the saponification must be run under superatmospheric pressure.

By reason of the factors discussed above, there is a need in the art for an improved low cost process for the manufacture of ethylene-acrylic acid copolymers.

SUMMARY OF THE INVENTION

The applicants have discovered an efficient, indirect process for the manufacture of ethylene-acrylic acid copolymers which can be carried out at atmospheric pressure in relatively simple equipment. In the process, a copolymer of ethylene and a methyl or ethyl ester of acrylic or methacrylic is first dissolved in a high-boiling diarylkane such as 1,1-dixylyethane. A transesterification catalyst and either isopropanol or tertiary butanol then is charged to the polymer solution. The solution is heated to reflux temperature to run a transesterification reaction between the isopropanol or tertiary butanol and the methyl or ethyl acrylate moiety with the liberated methanol or ethanol being removed from the reaction zone by distillation. In the next step of the process, any remaining free isopropanol or tertiary butanol is removed from the reaction zone by distillation. The polymer solution then is heated to a temperature sufficiently high to thermally crack the isopropyl or tertiary butyl acrylate moiety to convert the ester moiety to the corresponding acrylic acid. Upon cooling, the ethylene-acid acrylic copolymer precipitates from the solution and can be recovered by simple filtration steps.

DETAILED DESCRIPTION OF THE INVENTION

The ethylene copolymer employed as a starting material in the invention will be a copolymer of ethylene and either a methyl or ethyl ester of either acrylic or methacrylic acid. Such copolymers are known in the art and can be prepared by high pressure autoclave copolymerization processes as disclosed in U.S. Pat. No. 3,350,372. The mol % of the acrylate ester included in the starting copolymer should correspond to the mol % of acrylic acid desired in the ultimate ethylene-acrylic acid copolymer. Similarly, the molecular weight of the starting ethylene-alkyl acrylate copolymer should correspond to the molecular weight desired in the ultimately-obtained ethylene-acrylic acid copolymer. Typically, the starting copolyer will contain 1–20 and preferably 2–10 mol % of alkyl acrylate. The balance of the copolymer will consist predominantly or exclusively of polymerized ethylene. If desired, however, minor proportions of up to about 5 mol % of a third monomer species can be included in the starting ethylene-alkyl acrylate copolymer. Where a third comonomer is included in the copolymer, it can be any comonomer which readily copolymerizes with ethylene and an alkyl acrylate such as, for example, vinyl pyrrolidone, methyl vinyl ether, butyl vinyl ketone, and other monomers which, when polymerized, will not thermally decompose at the temperatures to which the copolymer will be subjected in the process. The molecular weight of the ethylene-alkyl acrylate copolymer will be such that the starting copolymer has a melt index in a range of about 0.5–2,000 and preferably about 1–100 as determined by ASTM Method D1238-70, Condition E.

The solvent employed as the reaction medium in the process will be a high-boiling diarylalkane. While the diarylalkane can have the aryl groups attached to any of the carbon atoms of the alkane chain, the unsymmetrical 1,1-diarylalkanes are more readily obtained at lower cost and are preferred for use in the invention. Typical diarylalkanes that can be employed in the invention include diphenyl methane, 1,1-diphenylethane, 1, 2-diphenylethane, ditolylmethane, and higher homologues thereof. The preferred diarylalkane for use in the invention is 1,1-dixylylethane.

In the first step of the process, the ethylene-alkyl acrylate copolymer is dissolved in the diarylalkane. This dissolution is preferably carried out by comminuting the copolymer to a finely-divided state and adding the finely-divided copolymer in small increments to a large excess of the heated diarylalkane with stirring. Since polymer solutions tend to be relatively viscous, convenience in handling and stirring makes it desirable to employ initial solutions containing 0.5–20 and preferably 2–10 weight % of the copolymer.

In the second step of the process, a catalytic quantity of a transesterification catalyst such as p-toluene sulfonic acid, methane sulfonic acid, or certain acidic types of acidic ion exchange resins such as Dowex 50 are charged to the polymer solution. A higher alkanol which is either isopropanol or isobutanol also is charged to the system at this time. The reaction system then is heated to reflux so that the transesterification reaction proceeds with the methyl or ethyl acrylate moiety being converted to the corresponding isopropyl or tertiary butyl acrylate with a corresponding liberation of methanol or ethanol. The temperature prevailing in the system at this point is set by the reflux temperature. The reflux temperature varies with the quantity of higher alkanol charged to the reaction and the quantity of methanol or ethanol formed by the transesterification. The reflux temperature can be kept relatively high (to increase the rate of transesterification) by initially charging only a portion of the isopropyl or tertiary butyl alcohol required to complete the ester interchange reaction and removing the overhead reflux from the reaction system. This procedure removes isopropanol or tertiary butanol from the reaction zone, together with the liberated methanol or ethanol. Fresh isoproponal or tertiary butanol is charged to the reaction system as makeup in a quantity corresponding to the higher alkanol removed as the overhead fraction.

The completion of the ester interchange reaction can be established by collecting and measuring the quantity of methanol or ethanol recovered from the reaction system. Alternatively, periodically samples of the reaction mixture can be withdrawn for analysis of the methyl or ethyl acrylate content of the polymer in the reaction zone, which analysis can be readily made by infrared analysis of the polymer.

The transesterification reaction can be carried to the point at which essentially all of the methyl or ethyl acrylate moiety has been converted to corresponding isopropyl or tertiary butyl acrylate moiety. If, however, it is desired to prepare a terpolymer of ethylene, acrylic acid, and a methyl or ethyl acrylate, the ester interchange reaction should be stopped at the appropriate point corresponding to the mol % of the methyl or ethyl acrylate desired in the final copolymer product.

Following completion of the transesterification reaction, the temperature of the reaction system is increased to remove any free isopropanol or tertiary butanol from the reaction system by distillation. Thereafter, the reaction mixture is heated to a temperature sufficiently high to thermally crack the isopropyl acrylate or the tertiary butyl acrylate moiety now present in the dissolved copolymer. Thermal cracking of these moieties begins at temperatures of the order of about 275° C and the cracking reaction proceeds at faster rates as the temperature is increased. Adequate cracking rates are obtained at temperatures of the order of 300°-340° C. If it is desired to run the cracking reaction at temperatures above the atmospheric boiling point of the diarylalkane, the system must be sealed so that the final step of the process is run at a pressure slightly above atmospheric pressure.

The following examples are set forth to illustrate the principles and practice of the invention. Where parts or percentages are set forth, they are parts and percentages by weight unless otherwise stated.

EXAMPLE 1

A flask fitted with a reflux condenser and a distillation take-off head was charged with 10 grams of ethylene-methyl acrylate copolymer containing 20 weight %, polymerized methyl acrylate, 300 cc of dixylyethane, 20 cc of isopropyl alcohol and 0.5 gram of p-toleune sulfonic acid. The solution was heated to 115° C under reflux for 1 hour. The cooling water to the condenser was shut off so that all of the alcohol in the system was removed as an overhead distillate. The temperature in the flask was increased to 320° C, maintained at this temperature for 1 hour, and then cooled to room temperature. The polymer separated as a distinct phase and was filtered off; washed with methyl alcohol, and dried. Infrared spectra of this product indicated about 50% conversion of the original ester groups to acid. No infrared bands associated with the isopropyl ester were noted.

EXAMPLE 2

Example 1 was repeated, except that 0.5 grams of methane sulfonic acid was used in place of the p-toluene sulfonic acid. Infrared spectra of the product indicated 40% conversion of the original ester to acid.

EXAMPLE 3

The apparatus of Example 1 was charged with 10 grams of an ethylene-methyl acrylate copolymer containing 20 weight % polymerized methyl acrylate, 300 cc of dixylyethane, 20 cc of isopropyl alcohol and 5 grams of the acid form of Dowex 50. Dowex 50 is described as a strongly acidic ion exchange resin. The solution was heated to 115° C under reflux for 1 hour. The solution was filtered to remove the Dowex 50 and then heated to 320° C for 1 hour. Upon cooling to room temperature, the solid polymer separated out. It was filtered off, washed with methyl alcohol and dried. Infrared spectra of the product indicated about 20% conversion of the original ester to acid.

EXAMPLE 4

Example 1 was repeated except that tertiary butanol was employed in lieu of isopropanol. Comparable results were obtained.

CONTROL EXPERIMENT A

Ten grams of an ethylene-methyl acrylate copolymer containing 20 weight % polymerized methyl acrylate and 300 cc of dixylyethane were heated to 320° C for 1 hour. On cooling to room temperature, a gel was formed. By repeated washing with methyl alcohol, a small amount of solid polymers was isolated from the gel and an infrared spectra of the polymer revealed it to be identical to the starting copolymer. This experiment shows that an ethylene-methyl acrylate copolymer will not decompose to form an ethylene-acylic acid copolymer.

Control Experiment B

Ten grams of a copolymer containing 70 weight % ethylene and 30 weight % isopropyl acrylate and 300 cc of dixylyethane heated to 320° C for 30 minutes. Upon cooling to room temperature the polymer separated out, was filtered off, washed with methyl alcohol and dried. An infrared spectra of the product indicated almost complete conversion to the acid form with no ester groups remaining. This experiment indicates that once an isopropyl acrylate ester is produced, it will decompose under the temperature conditions employed in the invention. Thus the rate limiting step of the process is the rate at which the methyl or ethyl ester of the copolymer undergoes transesterification with the isopropanol or tertiary butanol.

What is claimed:

1. A process for the manufacture of a copolymer containing polymerized ethylene and a polymerized acrylic acid which consists essentially of:
   (a) dissolving a copolymer containing polymerized ethylene and a polymerized lower alkyl ester of an acrylic acid in a diarylalkane,
   (b) adding a higher alkanol and a transesterification catalyst to the solution of (a),
   (c) heating the solution of (b) to reflux temperature to form higher alkyl esters of the acrylic acid and to liberate a lower alkanol by a transesterification reaction and distilling the lower alkanol from the reaction zone, (d) following the completion of step (c) increasing the solution temperature to remove any remaining higher alkanol from the reaction zone by distillation, and (e) heating the solution of step (d) to a temperature sufficiently high to thermally decompose the higher alkyl ester of the acrylic acid and form the corresponding acrylic acid, the copolymer charged in step (a) being a copolymer of ethylene and a methyl or ethyl ester of acrylic or methacrylic acid, the higher alkanol charged in step (b) being isopropanol or tertiary butanol.

2. The process of claim 1 in which the higher alkanol is isopropanol.

3. The process of claim 1 in which the diarylalkane is 1,1-dixylylethane.

4. The process of claim 2 in which the diarylalkane is 1,1-dixylyethane.

5. The process of claim 1 in which the copolymer is a copolymer of ethylene and methyl acrylate.

6. The process of claim 2 in which the copolymer is a copolymer of ethylene and methyl acrylate.

7. The process of claim 3 in which the copolymer is a copolymer of ethylene and methyl acrylate.

* * * * *